3,328,250
THERAPEUTIC COMPOSITION FOR THE REGULATION OF THE WATER-SODIUM METABOLISM CONTAINING AN ASSOCIATION OF FLAVONIC DERIVATIVES
Charles Mentzer, Verrieres-le-Buisson, France, assignor to Laboratoires Laroche Navarron, Levallois, France, a corporation of France
No Drawing. Filed Apr. 20, 1965, Ser. No. 449,639
Claims priority, application France, May 12, 1964, 974,145
10 Claims. (Cl. 167—65)

The present invention relates to a therapeutic composition for regulating the water-sodium metabolism encouraging the elimination of water and sodium by the urinary route, said composition containing as active principle an association or mixture of 5-hydroxy-3,7,3′,4′-tetramethoxy flavone and vitexoside.

5-hydroxy-3,7,3′,4′-tetramethoxy flavone or tetramethylquercetin, which name will be employed hereinafter, is a compound which is chemically defined by the formula:

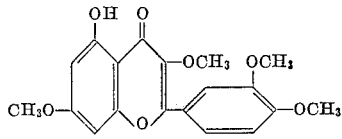

This compound is in the form of pale yellow flakes melting at 151–152° C. It is insoluble in water, soluble in boiling alcohol and chloroform. Its spectral curve is ultraviolet (in a $0.5 \times 10^{-5}$ solution in alcohol without reducing agent) has two absorption maxima at 255 m$\mu$ ($D_0 = 0.330$) and 350 m$\mu$ ($D_0 = 0.309$).

Tetramethylquercetin can be prepared by the selective methylation of quercetin or 3, 3′, 4′, 5, 7 pentahydroxy flavone by means of an appropriate methylation agent in accordance with the following example.

*Example*

The following reaction mixture is prepared:

|  | G. |
|---|---|
| Quercetin (1/50 mole) | 6.04 |
| Methyl sulfate (theoretical amount increase by ¹⁄₁₀) | 11.26 |
| $CO_3K_2$ previously dried in an oven | 11.26 |

Anhydrous acetone in an amount for dissolving the flavone.

The mixture is refluxed for 17 hours. After cooling and elimination of the solvent, the residue is triturated with concentrated ClH, washed with water and crystallized in alcohol.

In the French patent application 974,144, tetramethylquercetin is described and its natriuretic properties are disclosed.

Vitexoside is a chemically known compound having an empirical formula $C_{27}H_{32}O_{15}$ and the structural formula:

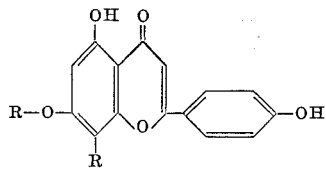

in which each of the R substituents is a glucosyl group.

It is present in the form of microscopic needles melting at 231–232° C. and its rotatory power LD is −7.9 in pyridine. It can be prepared by refluxing sheets of *Saponaria officinalis* with ethyl alcohol, the chlorophyll contained in the solution obtained being extracted and the vitexoside being separated from the thus purified solution by precipitation.

There is found in th French B.S.M. Patent No. 1,577 M of the applicant, filed Nov. 3, 1961 and issued Dec. 17, 1962, in addition to the detailed indication of the physical and chemical properties of vitexoside, a specific example of extraction of this compound from *Saponaria officinalis*.

In said B.S.M. patent the therapeutic properties of vitexoside, and in particular its diuretic properties, are also indicated.

It has now been discovered that the association of tetramethylquercetin and vitexoside, both of which are active in respect to the regulation of the water-sodium metabolism, produces a marked potentialization or synergic effect on the activity proper to each of these compounds as concerns the elimination of water and sodium by the urinary route.

These properties of the association renders it of value whenever there is an excessive retention of water and sodium by the organism either accidentally or subsequent to the administration of corticoids.

This potentialization of the action is observed irrespective of the relative proportions of the two constituents but above all in respect of equal proportions thereof by weight.

The following pharmacological tests confirm the foregoing.

These tests were carried out in accordance with a method adapted from that proposed by Lipschitz W. L., Z. Hadinian and A. Kerpesar (Jl. of Pharmacology— 1943 79 97).

The tests were carried out on male rats of the same origin weighing 130–170 g. and deprived of water and nourishment for 18 hours before the test.

The animals are divided into four homogeneous batches:

One batch serves as a reference batch and receives physiological serum at the dose of 2.5 ml./100 g. of body weight.

The three other batches receive the product to be tested respectively at the dose of:

10 mg. per 100 g. of body weight
20 mg. per 100 g. of body weight
50 mg. per 100 g. of body weight The substances are administered by individual forced feeding by means of an esophageal probe in solution or suspension in physiological serum to which is added 2% of gum in the proportion of 2.5 ml./100 g. of body weight.

The animals are placed in a metabolism testing cage, 2–3 animals being placed in each cage. The time is noted. At the end of 5 hours, a new forced urination of the animals is effected and the tests stopped. The urine from each cage is collected.

The following measurements are then taken from each sample:

The volume of urine issuing from each cage,
The chlorine content measured in accordance with a modified Votocek method (titration by mercuric nitrate in a nitric medium in the presence of diphenylcarbazone),
The sodium content by flame photometry.

In respect of each test:
(1) The mean body weight of the animals was ascertained.
(2) The diuresis over a period of 5 hours was evaluated and expressed as:

Per each animal
Per 100 g. of body weight so as to render the various tests comparable with each other; the chlorine and sodium contents are expressed As a concentration (namely in g./l.)
As the amount of ions eliminated, that is to say, the diuresis over a period of 5 hours is measured and expressed in mg./100 g. of body weight.

(3) In respect of each batch, the following values were ascertained:

Diuretic activity—

$$\frac{\text{diuresis in ml./5h./100 g. of the treated batch}}{\text{diuresis in ml./5h./100 g. of the reference batch}}$$

Chloriuretic activity—

$$\frac{\text{mg. of } Cl_2/5h./100 \text{ g. in the treated batch}}{\text{mg. of } Cl_2/5h./100 \text{ g. in the reference batch}}$$

Natriuretic activity—

$$\frac{\text{mg. of Na/5h./100 g. in the treated batch}}{\text{mg. of Na/5h./100 g. in the reference batch}}$$

Two or three series of tests were carried out with the following substances:

Tetramethylquercetin
Vitexoside
Tetramethylquercetin and vitexoside

The results of each group were collected and the mean activity coefficients were determined for each substance.

The results are listed in the following tables:

TETRAMETHYLQUERCETIN
[Test No. 1]

|  | Batch R Reference animals | Batch A 20 mg./100 g. | Batch B 50 mg./100 g. |
|---|---|---|---|
| Number of animals | 8 | 8 | 8 |
| Mean weight | 108 | 107 | 108 |
| Diuresis: | | | |
| Total in ml | 6.9 | 5.9 | 5.9 |
| Mean in ml | 0.86 | 0.74 | 0.74 |
| In 5 h. per 100 g. of body weight in ml | 0.80 | 0.70 | 0.70 |
| Chlorine: | | | |
| In g./l | 6.10 | 7.35 | 6.25 |
| In mg./5 h. per 100 g. of body weight | 4.9 | 5.1 | 4.3 |
| Sodium: | | | |
| In g./l | 3.4 | 3.55 | 3.88 |
| In mg./5 h. per 100 g. of body weight | 2.72 | 2.48 | 2.70 |
| Activity coefficients: | | | |
| Water | | 0.87 | 0.87 |
| Chloride | | 1.04 | 0.89 |
| Sodium | | 0.91 | 1 |

TETRAMETHYLQUERCETIN
[Test No. 2]

|  | Batch R Reference animals | Batch A 10 mg./100 g. | Batch B 20 mg./100 g. | Batch C 50 mg./100 g. |
|---|---|---|---|---|
| Number of animals | 5 | 5 | 5 | 5 |
| Mean weight | 136 | 135 | 136 | 136 |
| Diuresis: | | | | |
| Total in ml | 4.8 | 3.7 | 5.8 | 8.1 |
| Mean in ml | 0.96 | 0.74 | 1.16 | 1.6 |
| In 5 h. per 100 g. of body weight in ml | 0.70 | 0.54 | 0.85 | 1.1 |
| Chlorine: | | | | |
| In g./l | 8.1 | 9 | 6 | 4.9 |
| In mg./5 h. per 100 g. of body weight | 5.7 | 4.85 | 5.1 | 5.4 |
| Sodium: | | | | |
| In g./l | 2.35 | 3.05 | 3 | 2.95 |
| In mg./5 h. per 100 g. of body weight | 1.65 | 1.65 | 2.55 | 3.25 |
| Activity coefficients: | | | | |
| Water | | 0.77 | 1.20 | 1.50 |
| Chlorine | | 0.85 | 0.90 | 0.95 |
| Sodium | | 1 | 1.50 | 2 |

TETRAMETHYLQUERCETIN
[Test No. 3]

|  | Batch R Reference animals | Batch A 10 mg./100 g. | Batch B 20 mg./100 g. | Batch C 50 mg./100 g. |
|---|---|---|---|---|
| Number of animals | 4 | 4 | 4 | 4 |
| Mean weight | 170 | 171 | 169 | 169 |
| Diuresis: | | | | |
| Total in ml | 7.2 | 5.8 | 3.6 | 8 |
| Mean in ml | 1.8 | 1.45 | 0.9 | 2 |
| In 5 h. per 100 g. of body weight in ml | 1.05 | 0.84 | 0.53 | 1.18 |
| Chlorine: | | | | |
| In g./l | 6.6 | 7 | 9.9 | 6.1 |
| In mg./5 h. per 100 g. of body weight | 6.95 | 5.90 | 5.23 | 7.2 |
| Sodium: | | | | |
| In g./l | 2.55 | 2.80 | 3.70 | 2.30 |
| In mg./5 h. per 100 g. of body weight | 2.67 | 2.35 | 1.95 | 2.70 |
| Activity coefficients: | | | | |
| Water | | 0.8 | 0.5 | 1.1 |
| Chlorine | | 0.85 | 0.75 | 1.03 |
| Sodium | | 0.88 | 0.73 | 1 |

VITEXOSIDE
[Test No. 4]

|  | Batch R<br>Reference animals | Batch A<br>20 mg./100 g. | Batch B<br>50 mg./100 g. |
|---|---|---|---|
| Number of animals | 6 | 6 | 6 |
| Mean weight | 118 | 118 | 118 |
| Diuresis: | | | |
| Total in ml | 5.5 | 6.7 | 4.5 |
| Mean in ml | 0.91 | 1.11 | 0.75 |
| In 5 h. per 100 g. of body weight in ml | 0.77 | 0.94 | 0.63 |
| Chlorine: | | | |
| In g./l | 8 | 7.1 | 9 |
| In mg./5 h./per 100 g. of body weight | 6.2 | 6.6 | 5.7 |
| Sodium: | | | |
| In g./l | 2.5 | 2.7 | 3.10 |
| In mg./5 h. per 100 g. of body weight | 1.92 | 2.5 | 1.95 |
| Activity coefficients: | | | |
| Water |  | 1.22 | 0.82 |
| Chlorine |  | 1.06 | 0.92 |
| Sodium |  | 1.30 | 1 |

VITEXOSIDE
[Test No. 5]

|  | Batch R<br>Reference animals | Batch A<br>10 mg./100 g. | Batch B<br>20 mg./100 g. | Batch C<br>50 mg./100 g. |
|---|---|---|---|---|
| Number of animals | 5 | 5 | 5 | 5 |
| Mean weight | 155 | 154 | 155 | 155 |
| Diuresis: | | | | |
| Total in ml | 5 | 4.5 | 6.5 | 5.6 |
| Mean in ml | 1 | 0.9 | 1.3 | 1.1 |
| In 5 h. per 100 g. of body weight in ml | 0.64 | 0.58 | 0.84 | 0.7 |
| Chlorine: | | | | |
| In g./l | 8.85 | 9.1 | 8.1 | 9.3 |
| In mg./5 h. per 100 g. of body weight | 5.63 | 5.3 | 6.8 | 6.5 |
| Sodium: | | | | |
| In g./l | 3.5 | 4.2 | 2.95 | 4.85 |
| In mg./5 h. per 100 g. of body weight | 2.23 | 2.43 | 2.47 | 3.40 |
| Activity coefficients: | | | | |
| Water |  | 0.9 | 1.30 | 1.10 |
| Chlorine |  | 0.93 | 1.20 | 1.16 |
| Sodium |  | 1.08 | 1.10 | 1.52 |

VITEXOSIDE
[Test No. 6]

|  | Batch R<br>Reference animals | Batch A<br>10 mg./100 g. | Batch B<br>20 mg./100 g. | Batch C<br>50 mg./100 g. |
|---|---|---|---|---|
| Number of animals | 4 | 4 | 4 | 4 |
| Mean weight | 127 | 124 | 128 | 125 |
| Diuresis: | | | | |
| Total in ml | 5.3 | 6.8 | 5.7 | 6.8 |
| Mean in ml | 1.3 | 1.7 | 1.43 | 1.7 |
| In 5 h. per 100 g. of body weight in ml | 1.02 | 1.3 | 1.12 | 1.3 |
| Chlorine: | | | | |
| In g./l | 6.37 | 6.37 | 6.4 | 5.33 |
| In mg./5 h. per 100 g. of body weight | 6.5 | 8.28 | 7.5 | 6.9 |
| Sodium: | | | | |
| In g./l | 2.60 | 2.35 | 2.9 | 2 |
| In mg./5 h. per 100 g. of body weight | 2.65 | 3.04 | 3.2 | 2.60 |
| Activity coefficients: | | | | |
| Water |  | 1.27 | 1.10 | 1.27 |
| Chlorine |  | 1.27 | 1.10 | 1.06 |
| Sodium |  | 1.15 | 1.20 | 1 |

TETRAMETHYLQUERCETIN PLUS VITEXOSIDE
[Test No. 7]

|  | Batch R Reference animals | Batch A 10 mg./100 g. | Batch B 20 mg./100 g. | Batch C 50 mg./100 g. |
|---|---|---|---|---|
| Number of animals | 4 | 4 | 4 | 4 |
| Mean weight | 133 | 134 | 133 | 133 |
| Diuresis: | | | | |
| Total in ml | 3.7 | 5.9 | 4.2 | 4.9 |
| Mean in ml | 0.9 | 1.9 | 1.05 | 1.2 |
| In 5 h. per 100 g. of body weight in ml | 0.67 | 1.1 | 0.78 | 0.9 |
| Chlorine: | | | | |
| In g./l | 9.9 | 7.3 | 8.6 | 8.43 |
| In mg./5 h. per 100 g. of body weight | 6.6 | 8 | 6.7 | 7.6 |
| Sodium: | | | | |
| In g./l | 3.30 | 3 | 3.30 | 3.58 |
| In mg./5 h. per 100 g. of body weight | 2.20 | 3.30 | 2.60 | 3.20 |
| Activity coefficients: | | | | |
| Water | | 1.6 | 1.16 | 1.34 |
| Chlorine | | 1.21 | 1 | 1.15 |
| Sodium | | 1.50 | 1.18 | 1.47 |

TETRAMETHYLQUERCETIN PLUS VITEXOSIDE
[Test No. 8]

|  | Batch R Reference animals | Batch A 10 mg./100 g. | Batch B 20 mg./100 g. | Batch C 50 mg./100 g. |
|---|---|---|---|---|
| Number of animals | 4 | 4 | 4 | 4 |
| Mean weight | 154 | 154 | 155 | 153 |
| Diuresis: | | | | |
| Total in ml | 2.8 | 2.8 | 2.8 | 3 |
| Mean in ml | 0.70 | 0.70 | 0.70 | 0.75 |
| In 5 h. per 100 g. of body weight in ml | 0.45 | 0.45 | 0.45 | 0.49 |
| Chlorine: | | | | |
| In g./l | 10 | 11 | 11.1 | 10.5 |
| In mg./5 h. per 100 g. of body weight | 4.5 | 4.97 | 5 | 5.15 |
| Sodium: | | | | |
| In g./l | 3.4 | 3.6 | 3.4 | 3.55 |
| In mg./5 h. per 100 g. of body weight | 1.52 | 1.62 | 1.98 | 1.73 |
| Activity coefficients: | | | | |
| Water | | 1 | 1 | 1.1 |
| Chlorine | | 1.1 | 1.1 | 1.14 |
| Sodium | | 1.06 | 1.3 | 1.13 |

|  | Water | | | Chlorine | | | Sodium | | |
|---|---|---|---|---|---|---|---|---|---|
|  | 10 mg. | 20 mg. | 50 mg. | 10 mg. | 20 mg. | 50 mg. | 10 mg. | 20 mg. | 50 mg. |
| Tetramethylquercetin | 0.78 | 0.85 | 1.15 | 0.85 | 0.90 | 0.95 | 0.94 | 1.05 | 1.33 |
| Vitexoside | 1.08 | 1.21 | 1.06 | 1.10 | 1.12 | 1.05 | 1.11 | 1.20 | 1.17 |
| Vitexoside plus Tetramethylquercetin | 1.30 | 1.08 | 1.22 | 1.05 | 1.15 | 1.05 | 1.28 | 1.24 | 1.30 |

It can be seen that the association of tetramethylquercetin and vitexoside gives an excellent potentialization of the actions of these substances, since each of the elimination powers is increased by the association. This improvement is marked as concerns water and above all sodium, the natriuresis being reinforced and regularized. This increase in the power of elimination of sodium, which occurred regularly at the three tested doses, is about 30% relative to the elimination of sodium of the reference animals.

In view of the foregoing, the indications of the therapeutic composition according to the invention are cases of retention of water and sodium by the organism manifested by a disturbance of the water-sodium metabolism.

In these indications, the composition is advantageously administered by the oral route at the daily dose of 0.10–1.20 g. Forms appropriate for this manner of administration are tablets and pills, the active principle being associated with the usual vehicles and excipients.

By way of illustration, there will now be given two examples of tablets, one having a small dose and the other a high dose of active principles, for the purpose of facilitating the prescriptions:

|  | G. |
|---|---|
| Tetramethylquercetin | 0.05 |
| Vitexoside | 0.05 |
| Lactose | 0.075 |
| Starch | 0.010 |
| Magnesium stearate | 0.005 |
| Talc | 0.010 |
| Tetramethylquercetin | 0.20 |
| Vitexoside | 0.20 |
| Lactose | 0.075 |
| Starch | 0.010 |
| Magnesium stearate | 0.005 |
| Talc | 0.010 |

(For one pill)

2–6 of these tablets can be administered daily.

Having now described my invention what I claim as new and desire to secure by Letters Patent is:

1. A therapeutic composition for regulating the water-sodium metabolism, encouraging the elimination of water and sodium by the urinary route, comprising a mixture of tetramethylquercetin and vitexoside and a pharmaceutically acceptable vehicle.

2. A therapeutic composition for regulating the water-sodium metabolism, encouraging the elimination of water and sodium by the urinary route, comprising a mixture in substantially equal parts by weight of tetramethylquercetin and vitexoside and a pharmaceutically acceptable vehicle.

3. A therapeutic composition for regulating the water-sodium metabolism, encouraging the elimination of water and sodium by the urinary route, comprising a mixture of tetramethylquercetin and vitexoside and an orally acceptable vehicle, said mixture being present in an amount appropriate for the oral administration of 0.10–1.20 g. of the mixture per day.

4. A therapeutic composition for regulating the water-sodium metabolism, encouraging the elimination of water and sodium by the urinary route in the form of tablets comprising a mixture of tetramethylquercetin and vitexoside and a solid base for tablets.

5. A composition as claimed in claim 4, wherein the tetramethylquercetin and vitexoside are present in substantially equal amounts by weight.

6. A composition as claimed in claim 5, wherein each tablet contains about 0.10–0.40 g. of the mixture.

7. A process for regulating the water-sodium metabolism in patients by encouraging the elimination of water and sodium by the urinary route, said process comprising administering to the patients a mixture of tetramethylquercetin and vitexoside.

8. A process for regulating the water-sodium metabolism in patients by encouraging the elimination of water and sodium by the urinary route, said process comprising administering orally to the patients a mixture of tetramethylquercetin and vitexoside.

9. A process as claimed in claim 8, wherein 0.10–1.20 g. of the mixture are administered daily.

10. A process as claimed in claim 9, wherein tetramethylquercetin and vitexoside are present in the mixture in amounts which are substantially equal by weight.

References Cited

Rahman: Chemical Abstracts, vol. 57, col. 2179(e), 1962.

ALBERT T. MEYERS, *Primary Examiner.*

JULIAN S. LEVITT, *Examiner.*

L. B. RANDALL, *Assistant Examiner.*